United States Patent
Waidhas et al.

(10) Patent No.: US 12,209,317 B2
(45) Date of Patent: Jan. 28, 2025

(54) ELECTROLYSIS SYSTEM AND METHOD FOR OPERATING AN ELECTROLYSIS SYSTEM

(71) Applicant: Siemens Energy Global GmbH & Co. KG, Bayern (DE)

(72) Inventors: Manfred Waidhas, Nuremberg (DE); Erik Wolf, Röttenbach (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 279 days.

(21) Appl. No.: 17/776,527

(22) PCT Filed: Nov. 19, 2020

(86) PCT No.: PCT/EP2020/082641
§ 371 (c)(1),
(2) Date: May 12, 2022

(87) PCT Pub. No.: WO2021/104978
PCT Pub. Date: Jun. 3, 2021

(65) Prior Publication Data
US 2022/0380908 A1    Dec. 1, 2022

(30) Foreign Application Priority Data
Nov. 27, 2019    (EP) ...................................... 19211775

(51) Int. Cl.
*C25B 1/04*    (2021.01)
*C25B 9/05*    (2021.01)
(Continued)

(52) U.S. Cl.
CPC .................. *C25B 1/04* (2013.01); *C25B 9/67* (2021.01); *C25B 15/021* (2021.01); *C25B 15/023* (2021.01); *C25B 9/05* (2021.01)

(58) Field of Classification Search
CPC .. C25B 9/05; C25B 9/67; C25B 15/00; C25B 15/02; C25B 15/021
See application file for complete search history.

(56) References Cited

U.S. PATENT DOCUMENTS

| 7,850,838 B2 * | 12/2010 | Dreier | ..................... C25B 15/00 204/239 |
| 10,981,809 B2 * | 4/2021 | Lin | ........................ F04D 13/024 |

(Continued)

FOREIGN PATENT DOCUMENTS

| CN | 101514462 A | 8/2009 |
| CN | 101956205 A | 1/2011 |

(Continued)

OTHER PUBLICATIONS

International search report and written opinion dated Mar. 12, 2021 for corresponding PCT/EP2020/082641.

*Primary Examiner* — Brian W Cohen
(74) *Attorney, Agent, or Firm* — Wolter Van Dyke Davis, PLLC

(57) ABSTRACT

An electrolysis system for electrochemically breaking down water to form hydrogen and oxygen, having at least one electrolyser for electrochemically breaking down water to form hydrogen and oxygen. The electrolysis system also has a housing device for receiving the electrolyser, wherein the electrolyser is at least partially arranged in the housing device and the housing device is sealed relative to a first fluid surrounding the housing device. In the electrolyser, water is broken down to form hydrogen and oxygen. The hydrogen and the oxygen are directed out of the housing device.

17 Claims, 1 Drawing Sheet

(51) Int. Cl.
*C25B 9/67* (2021.01)
*C25B 15/021* (2021.01)
*C25B 15/023* (2021.01)

(56) References Cited

U.S. PATENT DOCUMENTS

2019/0010621 A1* 1/2019 Bogers ................... C25B 15/02
2019/0093242 A1 3/2019 Petitjean
2019/0264341 A1 8/2019 Bahar
2019/0376196 A1* 12/2019 Mohri .................... C25B 15/02
2021/0172074 A1 6/2021 Hahn

FOREIGN PATENT DOCUMENTS

| CN | 102965687 A | 3/2013 |
| DE | 202005003934 U1 | 6/2005 |
| DE | 102005011316 A1 | 10/2006 |
| DE | 102012000755 A1 | 7/2013 |
| DE | 102012112559 B3 | 12/2013 |
| JP | 2003342771 A | 12/2003 |

* cited by examiner

ELECTROLYSIS SYSTEM AND METHOD FOR OPERATING AN ELECTROLYSIS SYSTEM

CROSS REFERENCE TO RELATED APPLICATIONS

This application is the US National Stage of International Application No. PCT/EP2020/082641 filed 19 Nov. 2020, and claims the benefit thereof. The International Application claims the benefit of European Application No. EP19211775 filed 27 Nov. 2019. All of the applications are incorporated by reference herein in their entirety.

FIELD OF INVENTION

The present invention relates to an electrolyser for decomposition of water to afford hydrogen and oxygen and to a process for operating the electrolyzer.

BACKGROUND OF INVENTION

An electrolyser is an apparatus that uses electrical current to bring about a transformation of matter. The variety of different electrolyses is reflected by the multiplicity of electrolyzers in existence, for example an electrolyzer for hydrogen electrolysis.

Current thinking favors using energy from renewable sources during sunny and windy periods, i.e. periods with above-average solar or wind power generation, to produce value products. One such value product may be hydrogen which is produced using water electrolyzers. The hydrogen can be used to produce so-called EE gas.

This comprises initially producing hydrogen using electrical energy, in particular from wind energy or solar energy, in a (hydrogen electrolysis) electrolyzer. The hydrogen is then used, together with carbon dioxide, to produce methane in a Sabatier process. The methane can then be introduced into an already present natural gas network and thus allows storage and transport of energy to the consumer and can thus relieve an electrical network. Alternatively, the hydrogen generated by the electrolyser can also be used directly, for example for a fuel cell.

In an electrolyzer for hydrogen electrolysis, water is decomposed into hydrogen and oxygen. In a PEM electrolyser, distilled water is typically supplied on the anode side and split into hydrogen and oxygen at a proton-exchange membrane (PEM). The water is oxidized to oxygen at the anode. The protons pass through the proton-exchange membrane. Hydrogen is produced on the cathode side. An electrolysis unit typically comprises at least four electrolysis modules. An electrolysis module typically comprises 50 electrolytic cells.

An electrolyser is typically installed in containers or buildings to protect it from external influences such as especially precipitation. These containers or buildings are ventilated. Ventilation ensures heat exchange with the environment. Furthermore, air is exchanged at an air exchange rate sufficient to neutralize gas leaks and to ensure adequate cooling. The ventilation is in particular performed continuously.

Disadvantageously, the air exchange during ventilation results in the introduction of dust, salts or undesired gases from the environment into the container or the building. This can disadvantageously result in increased maintenance requirements for the electrolyzer and shorten the service life of an electrolyzer. Flammable gases may further disadvantageously enter the building or container.

SUMMARY OF INVENTION

It is accordingly an object of the present invention to specify an electrolysis system and a process for operating an electrolysis system which overcomes the recited disadvantages.

The object is achieved with an electrolysis system and a process for operating an electrolysis system according to the claims.

The electrolysis system according to the invention for electrochemical decomposition of water to afford hydrogen and oxygen comprises at least one electrolyzer for electrochemical decomposition of water to afford hydrogen and oxygen. It further comprises a housing apparatus for accommodating the electrolyzer. The entire electrolyser/electrolysis system (more than just the stack) is arranged in the housing apparatus. The housing apparatus is tightly sealed off from a first fluid surrounding the housing apparatus, wherein a first pressure inside the housing apparatus is higher than a second pressure outside the housing apparatus. The electrolysis system further comprises a heat exchanger arranged in the housing apparatus for thermal equalization of the temperature in the housing apparatus and outside the housing apparatus.

The process according to the invention for operating an electrolysis system for decomposition of water to afford hydrogen and oxygen comprises a plurality of steps. Initially an electrolysis system comprising at least one electrolyzer for electrochemical decomposition of water to afford hydrogen and oxygen is provided. The electrolysis system further comprises a housing apparatus for accommodating the electrolyzer, wherein the entire electrolyzer is arranged in the housing apparatus and the housing apparatus is tightly sealed off from a first fluid surrounding the housing apparatus, wherein a first pressure inside the housing apparatus is higher than a second pressure outside the housing apparatus. Decomposition of water to afford hydrogen and oxygen is then carried out in the electrolyser. The hydrogen and the oxygen are discharged from the housing apparatus. The electrolysis system is more than just a stack and comprises a plurality of stacks with their accompanying infrastructure.

The electrolyzer is advantageously sealed off from an outer environment which comprises the first fluid. Thus, no undesired components, such as dust, salts, in particular from sea air, or gases, can contact the electrolyzer or mix with the medium surrounding the electrolyzer. The electrolyzer is thus advantageously protected from external influences.

It is advantageous when a first pressure inside the housing apparatus is higher than a second pressure outside the housing apparatus. The difference between the first pressure and the second pressure is in particular less than 200 mbar, advantageously less than 50 mbar.

The housing apparatus further comprises a heat exchanger for thermal equalization of the temperature in the housing apparatus and outside the housing apparatus. This advantageously ensures that the heat formed during electrolysis is discharged from the electrolysis system. It is particularly advantageous when the dissipation of heat is effected indirectly via a heat exchanger, thus advantageously avoiding the need for components to be exchanged with the environment.

In a further advantageous embodiment and development of the invention the electrolysis system comprises at least one oxygen sensor. Alternatively or in addition the electrolysis system comprises a hydrogen sensor. This advantageously allows the concentration of the hydrogen and the oxygen to be detected, thus allowing leaks to be detected early enough for countermeasures to be introduced.

In a further advantageous embodiment and development of the invention the housing apparatus has a chemical molecular scavenger for reducing hydrogen, oxygen and/or water arranged in it. This is advantageously a countermeasure especially for an excessively high oxygen content and/or hydrogen content in the first fluid. Excessive moisture too, which can damage the electrolyser, may be reduced using chemical molecular scavengers or moisture-transporting membranes. This advantageously makes it possible avoid corrosion of the components through dewing, which can in turn lead to an elevated risk of electrical shorts. The components thus need not be configured for dewing, thus advantageously simplifying construction and lowering costs.

In a further advantageous embodiment and development of the invention the housing apparatus has an electrochemical hydrogen pump arranged in it. An electrochemical pump transports hydrogen across a membrane, particularly across a proton exchange membrane, upon application of electric current. This advantageously makes it possible for hydrogen to be selectively transported from the inside of the housing apparatus to the outside through a membrane gas-tight for gases other than hydrogen.

In a further advantageous embodiment and development of the invention the electrolysis system comprises a fuel cell. The fuel cell is operated with hydrogen, in particular the product of the electrolyzer, as fuel and with the air, i.e. the air inside the housing apparatus, as oxidizer. Oxygen from the air is consumed, thus making the exhaust air from the fuel cell lower in oxygen than the feed air to the fuel cell. The oxygen, can advantageously be reduced such to such an extent that a flammable gas mixture cannot be formed in the event of an electrolyzer hydrogen leak. This advantageously increases the occupational safety of the electrolysis system.

In a further advantageous embodiment and development of the invention the electrolysis system comprises a filling apparatus for filling the housing apparatus with the second fluid. In particular the filling apparatus advantageously makes it possible to perform volume compensations in particular on account of an altered air pressure or an altered temperature. The filling apparatus especially comprises pressurized gas vessels filled with inert gas.

In a further advantageous embodiment and development of the invention the electrolysis system comprises a separation apparatus for removing water from the second fluid. The separation apparatus especially comprises an absorption bed or an adsorption bed. The adsorption bed especially comprises a silica gel as the adsorbent. The separation apparatus may also be configured as a cold trap. It is also possible to transport water out of the housing apparatus using water vapor-permeable membranes, in particular using moisture-transporting membranes (for example Gore-Tex membranes). The moisture content of the second fluid is advantageously kept low.

In a further advantageous embodiment and development of the invention the housing apparatus comprises a shell, wherein the shell has a fluid-tightly sealing through-flow apparatus arranged in it. This fluid-tightly sealing through-flow apparatus advantageously allows discontinuous ventilation of the housing apparatus. The through-flow apparatus may in particular be a flap, a valve or a pump opening.

In a further advantageous embodiment and development of the invention, the electrolyzer of the electrolysis system comprises a periphery which comprises conduits and heat exchangers. This periphery is arranged in the housing apparatus. Accordingly, it is not only the electrolyzer but also all feed and discharge conduits and heat exchangers that are protected from external influences of the environment. This advantageously reduces maintenance intervals.

In a further advantageous embodiment and development of the invention the first fluid is a gas mixture, in particular air. The housing apparatus advantageously provides protection from the air surrounding the housing apparatus. This can include combustible gases, especially in the vicinity of refineries.

In a further advantageous embodiment and development of the invention the housing apparatus is filled with a second fluid. The second fluid is in particular a gas or a gas mixture. In other words this means that a protective gas is arranged in the housing apparatus to surround the electrolyzer. This protective gas is in particular an inert gas. Employable inert gases include in particular nitrogen, carbon dioxide, non-flammable chlorofluorocarbon-substitute gases or noble gases.

In a further advantageous embodiment and development of the invention the second fluid employed is a low-oxygen or oxygen-free fluid. This advantageously further increases the safety of the electrolysis system, since small leaks of hydrogen may be compensated.

In a further advantageous configuration and development of the invention the second fluid has a different composition to the first fluid.

Further features, properties and advantages of the present invention are provided by the description that follows with reference to the accompanying figures.

DETAILED DESCRIPTION OF INVENTION

Figure 1:
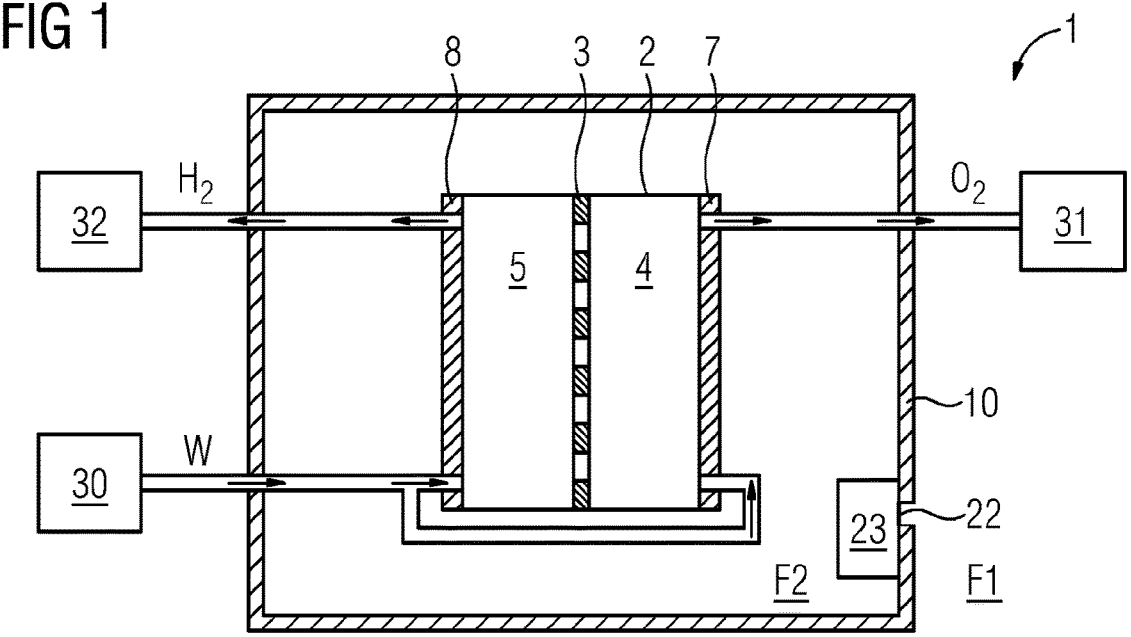
FIG. 1 is a schematic diagram of an electrolysis system having an electrolyzer comprising an electrolytic cell and a housing apparatus.

FIG. 1 shows an electrolysis system 1 having an electrolyzer comprising an electrolytic cell 2 and a housing apparatus 10. An electrolyser typically comprises several electrolytic cells 2. These electrolytic cells 2 are in particular arranged in stacks. For the sake of simplicity FIGS. 1 and 2 each show only one electrolytic cell 2. However, in principle the entire electrolyzer is arranged in the housing apparatus 10.

The housing apparatus 10 has the electrolytic cell 2 arranged in it. The electrolytic cell 2 comprises an anode space 4 and a cathode space 5. The anode space 4 has an anode 7 arranged in it. The cathode space 5 has a cathode 8 arranged in it. Water W flows from a water storage apparatus 30 into the anode space 4 and the cathode space 5. The water W is subjected to decomposition to afford $H_2$ and oxygen $O_2$ in the electrolytic cell 2. The hydrogen $H_2$ exits the electrolytic cell 2 and the housing apparatus 10. It is passed into hydrogen storage apparatus. The oxygen $O_2$ exits the anode space 4 and is passed into an oxygen storage apparatus 31 or is released to the environment outside the housing apparatus 10. The feedthroughs of the water-conducting, hydrogen-conducting and oxygen-conducting conduits through the housing apparatus 10 are fluid-tight. Outside the housing apparatus 10 is a first fluid F1. This fluid is especially air contaminated with salt or dust. Inside the housing apparatus 10 is a second fluid F2. The second fluid F2 especially comprises a gas mixture comprising very little, if any, oxygen. The second fluid is especially nitrogen.

The electrolytic cell 2 and the peripheral conduits are thus advantageously protected from external influences by the first fluid F1. In order to ensure heat exchange the housing apparatus 10 comprises a second heat exchanger 23. Valve 22 may be used to allow the first fluid F1 to flow into said exchanger to transport heat from the housing apparatus 10 into the environment.

Further valves may also be arranged in the housing apparatus 10. These may in particular be used to vent the second fluid F2 into the environment, i.e. into the first fluid F1, in the case of a hydrogen or oxygen leak. This is not shown in the figures.

Figure 2:
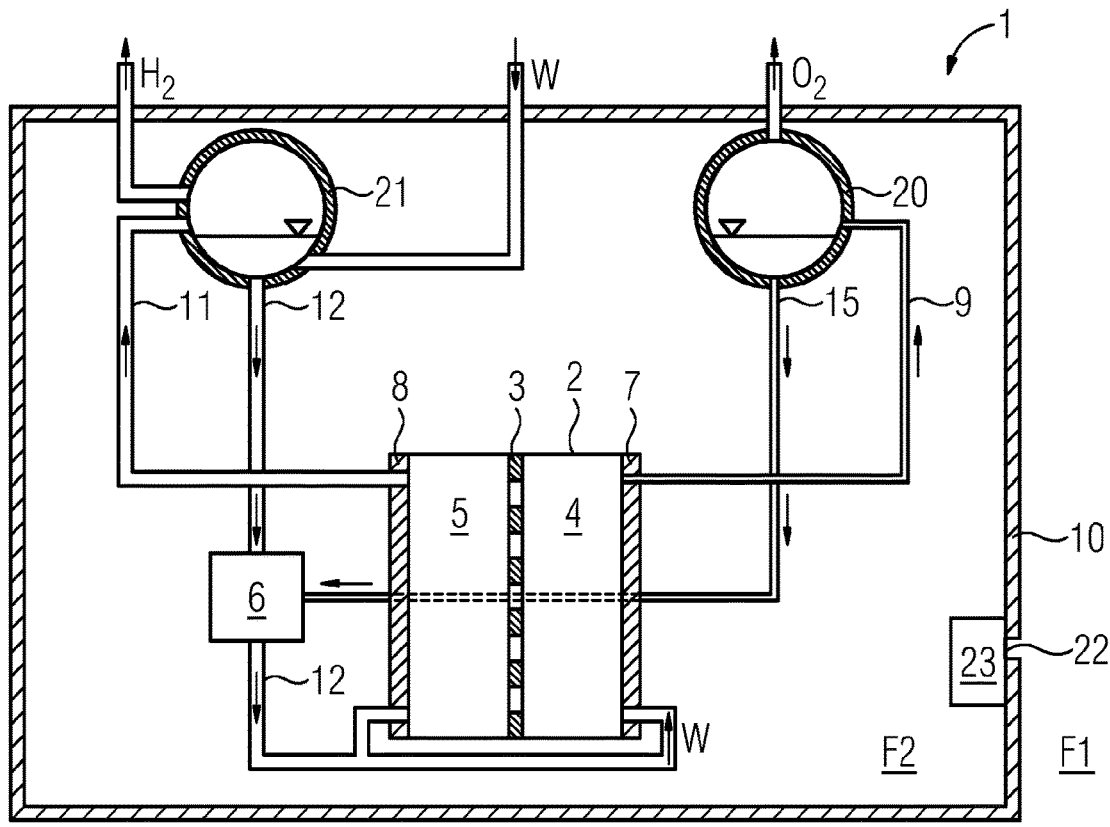
FIG. 2 is a schematic diagram of an electrolysis system having an electrolyzer comprising an electrolytic cell, a periphery and a housing device.

FIG. 2 shows a second exemplary embodiment of an electrolysis system 1 comprising an electrolytic cell 2. In this second exemplary embodiment electrolysis is carried out at atmospheric pressure with natural circulation. This therefore advantageously requires just a few, if any, pumps. This setup comprises a periphery which especially comprises conduits and separation apparatuses.

Virtually all components (with the exception of the material storage apparatuses) are arranged in a housing apparatus 10 in this example. The housing apparatus 10 protects the components inside the housing apparatus 10 in particular from dust or salt from the environment. Outside the housing apparatus 10 is a first fluid F1. This comprises in particular dust or salt. Inside the housing apparatus 10 is a second fluid F2. This is especially a gas mixture containing very little, if any, oxygen. As already illustrated in the first exemplary embodiment the oxygen conduit, the hydrogen conduit and the water conduit are arranged such that they pass through the housing apparatus 10 in a fluid-tight manner. This means that the conduits are passed through an opening in the shell of the housing operators and is open is subsequently fluid-tightly sealed. In order to allow heat exchange with the environment the housing apparatus 10, in particular the shell of the housing apparatus 10, comprises a second heat exchanger 23. A valve may be used to pass the first fluid F1 from the environment through said heat exchanger so that the first fluid can absorb heat from the housing apparatus 10 and dissipate it to the environment.

The electrolytic cell 2 comprises a proton exchange membrane 3 which separates the anode space 4 from the cathode space 5. The anode space 4 comprises an anode 7. The cathode space 5 comprises a cathode 8. In the anode space 4, water W is oxidized to oxygen $O_2$ at the anode 7. The oxygen-water mixture formed during the electrolysis in the anode space 4 has a lower density than pure water. It therefore ascends in the first conduit 9, also known as a riser tube, into a first gas separation apparatus 20. The first gas separation apparatus 20 is arranged above the anode space 4. In the first gas separation apparatus 20 the oxygen separates from the water. The oxygen $O_2$ is especially passed into an oxygen storage means (now shown in the figure). The water W is passed via a second conduit 15 into a first heat exchanger 6. In the cathode space water is reduced to hydrogen $H_2$ at the cathode 8 during the electrolysis. On account of the relatively low density relative to water the hydrogen-water mixture ascends especially in the context of a "forced circulation" via a third conduit 11 into a second gas separation apparatus 21. In the second gas separation apparatus 21 the hydrogen $H_2$ separates from the water W. The hydrogen $H_2$ exits the housing apparatus 10 and is advantageously passed into a hydrogen storage means. The water W may be passed into the first heat exchanger 6 via a fourth conduit 12. The water W is subsequently recycled from the first heat exchanger 6 into the anode space 4 and the cathode space 5. The first heat exchanger 6 is operated with a coolant, especially water. No mass transfer occurs between this coolant and the water from the electrolysis. The coolant inflow and outflow from the first heat exchanger 6 is not shown in FIG. 2 for the sake of simplicity.

The electrolysis system 1 can advantageously be operated dynamically, i.e. depending on the load the electrolysis unit may be operated with an energy density of more than 0 $A/cm^2$ to 4 $A/cm^2$, particularly advantageously of more than 1 $A/cm^2$ to 3 $A/cm^2$.

The first and the second gas separation apparatus 20, 21 are at a second height. The maximum height of the electrolytic cell is at a first height. The second height is above the first height. Thus the density differences resulting in the electrolyzer alone can ensure a natural circulation of the reactants and products in the electrolyzer. However, both heights must be above the first height of the electrolytic cell. Additional pumps or other conveying means are advantageously unnecessary. As an alternative to the embodiment shown here it is also possible to perform the natural circulation exclusively on the oxygen side, i.e. in the anode space 4. The principle of natural circulation which is based on the physical parameter of density results in automatic control of the water conveying rate. In a suitable process configuration an increased gas production rate thus increases the water conveying rate, with the result that the heat in turn is advantageously dissipated.

The operation of natural circulation at atmospheric pressure is particularly advantageous since at this pressure the gas bubble size of the hydrogen and/or oxygen and thus the resulting transportability in respect of the gases and the water is sufficiently large to allow pumps to be completely avoided.

The water circuits of the hydrogen and oxygen side, i.e. the water in the anode space 4 and in the cathode space 5, are connected to one another via the first heat exchanger 6.

It is clear from the reaction equation of water splitting that the decomposition of the water results in approximately twice the volume of hydrogen gas relative to oxygen gas. Thus at identical pipe diameter of the hydrogen side and the oxygen side the hydrogen side would exhibit a higher water conveying rate than the oxygen side, provided that the conveying rate is not limited by the pipe diameter. If the conveying rate of the water is limited by the riser tube, the conveying rate may be optimized by adapting the riser pipe diameter. In order thus to optimize the water flow on both sides the first diameter of the first conduit 9 is made smaller than the second diameter of the third conduit 11. It is particularly advantageous when the first conduit 9 has a cross sectional area of about half of the cross sectional area of the third conduit 11. A higher water conveying rate, in particular on the anode side, can advantageously be achieved compared to a conventional identical pipe diameter distribution.

LIST OF REFERENCE NUMERALS 1 electrolysis system
2 electrolytic cell
3 proton exchange membrane
4 anode space
5 cathode space
6 first heat exchanger 7 anode
8 cathode
9 first conduit
10 housing apparatus
11 third conduit
12 fourth conduit
15 second conduit
20 first gas separation apparatus
21 second gas separation apparatus
22 valve
23 second heat exchanger
30 water storage apparatus
31 oxygen storage apparatus
32 hydrogen storage apparatus
W water
$H_2$ hydrogen
$O_2$ oxygen
F1 first fluid
F2 second fluid

The invention claimed is:

1. An electrolysis system for electrochemical decomposition of water to afford hydrogen and oxygen, comprising:
   an electrolyzer for electrochemical decomposition of water to afford hydrogen and oxygen,
   a housing apparatus for accommodating the electrolyzer,
   wherein the electrolyzer is entirely arranged in the housing apparatus, wherein the housing apparatus is filled with a second fluid to surround the electrolyzer, wherein the second fluid comprises a gas or gas mixture, and wherein the housing apparatus is fluidically sealed off from a first fluid surrounding the housing apparatus,
   wherein a first pressure inside the housing apparatus is higher than a second pressure outside the housing apparatus, and
   a housing heat exchanger arranged in the housing apparatus configured for thermal equalization of a temperature of the second fluid in the housing apparatus with a temperature outside the housing apparatus.

2. The electrolysis system as claimed in claim 1, further comprising:
   at least one oxygen sensor.

3. The electrolysis system as claimed in claim 1, further comprising:
   at least one hydrogen sensor.

4. The electrolysis system as claimed in claim 1,
   wherein the housing apparatus comprises a chemical molecular scavenger for reducing hydrogen, oxygen and/or water arranged in the housing apparatus.

5. The electrolysis system as claimed in claim 1,
   wherein the housing apparatus further comprises an electrochemical hydrogen pump arranged in the housing apparatus.

6. The electrolysis system as claimed in claim 1,
   wherein the housing apparatus comprises a shell, wherein the shell has a fluidically sealed through-flow apparatus arranged in the shell and configured to allow discontinuous ventilation of the housing apparatus.

7. The electrolysis system as claimed in claim 1, wherein a periphery of the electrolyzer comprising conduits.

8. A process for operating an electrolysis system for decomposition of water to afford hydrogen and oxygen, comprising:
   providing the electrolysis system comprising an electrolyzer for electrochemical decomposition of water to afford hydrogen and oxygen, comprising a housing apparatus for accommodating the electrolyzer, wherein the electrolyzer is entirely arranged in the housing apparatus, wherein the housing apparatus is filled with a second fluid to surround the electrolyzer, wherein the second fluid comprises a gas or gas mixture, wherein the housing apparatus is fluidically sealed off from a first fluid surrounding the housing apparatus, and wherein a first pressure inside the housing apparatus is higher than a second pressure outside the housing apparatus,
   decomposing the water to afford the hydrogen and the oxygen in the electrolyzer,
   discharging the hydrogen and the oxygen from the housing apparatus, and
   equalizing a temperature of the second fluid in the housing apparatus with a temperature outside the housing apparatus using a housing heat exchanger that is disposed inside the housing apparatus.

9. The process as claimed in claim 8,
   wherein the first fluid is a gas mixture.

10. The process as claimed in claim 8,
    wherein the second fluid comprises a low-oxygen or oxygen-free fluid.

11. The process as claimed in claim 8,
    wherein the second fluid has a different composition to the first fluid.

12. The process as claimed in claim 9,
    wherein the first fluid is air.

13. The electrolysis system as claimed in claim 1,
    wherein the housing heat exchanger is configured to allow the first fluid to flow into the housing heat exchanger and then out of the housing heat exchanger to transport heat from the housing apparatus.

14. The electrolysis system as claimed in claim 1, wherein the electrolyzer further comprises:
    a first gas separation device configured to separate the oxygen from the water; and
    a second gas separation device configured to separate the hydrogen from the water.

15. The electrolysis system as claimed in claim 14,
    wherein the electrolyzer comprises an electrolytic cell; and
    wherein the first gas separation device and the second gas separation device are disposed above the electrolytic cell and configured to enable a natural circulation of the hydrogen, the oxygen, and the water in the electrolyzer.

16. The electrolysis system as claimed in claim 14, wherein the electrolyzer further comprises:
    an electrolysis heat exchanger configured to cool water received from at least one of the first gas separation device and the second gas separation device.

17. The electrolysis system as claimed in claim 1, further comprising a second heat exchanger arranged in the housing apparatus.

* * * * *